United States Patent Office 2,964,871
Patented Dec. 20, 1960

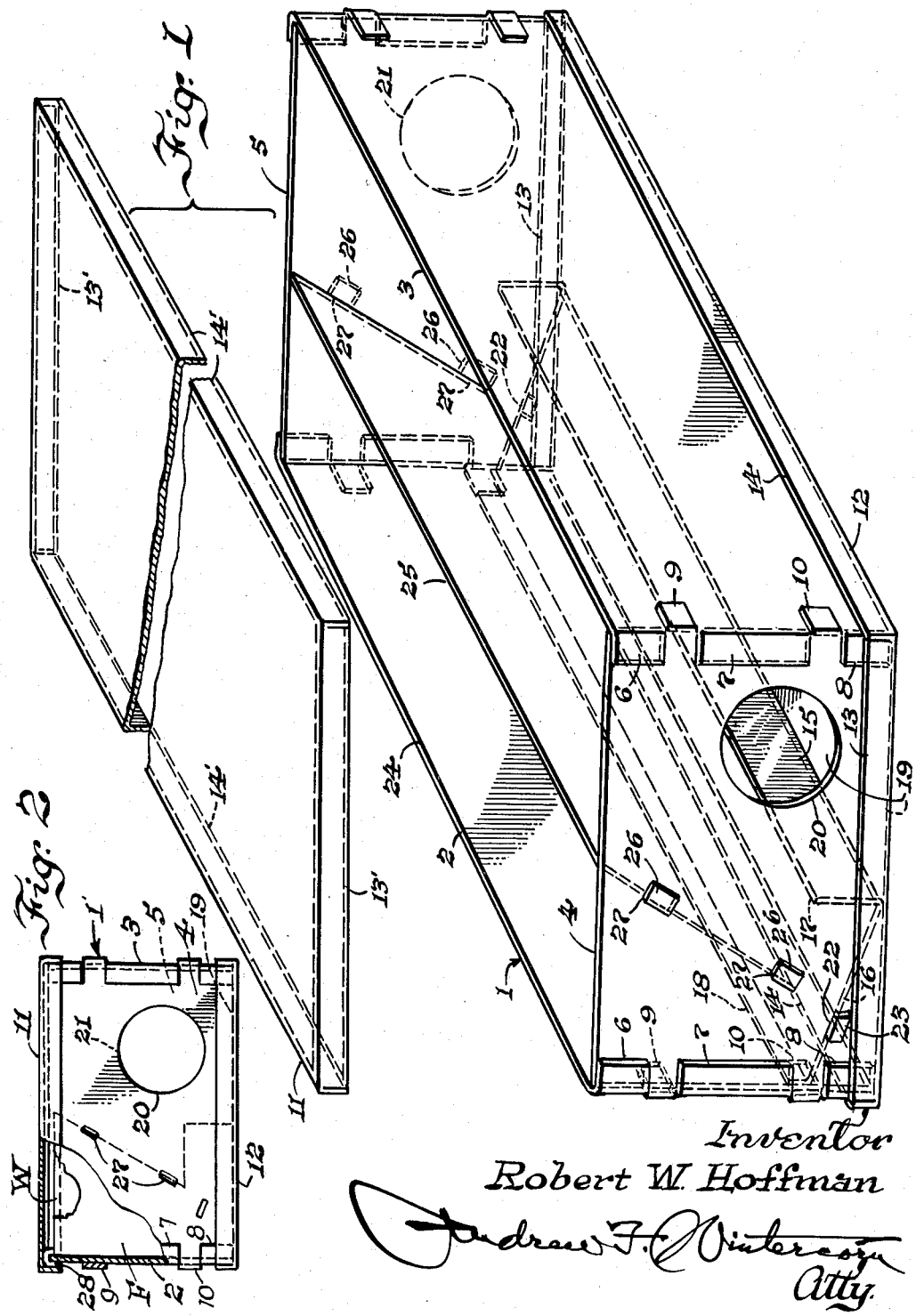

2,964,871

BAITING STATION FOR RATS, MICE, ETC.

Robert W. Hoffman, 310 12th Ave., Sterling, Ill.

Filed May 3, 1957, Ser. No. 656,810

4 Claims. (Cl. 43—131)

This invention relates to a baiting station for rats and mice, and the like, and has for its principal object the provision of a simple and economical knockdown sheet metal construction designed to enable shipment of the unit in a compact package to the purchaser for assembly after arrival, the unit when set up for use in a farm yard for feeding poisonous food such as warfarin mixed bait, keeping the food clean and dry so that it will not become moldy, while at the same time providing a hidden place to eat and one which only rats and mice are apt to enter.

Other features of the present construction worthy of mention are:

(1) The provision of projecting lugs on the edges of certain pieces arranged to project through slots provided in abutting pieces so that the mode of assembly is fairly well indicated by seeing which parts fit together, and the purchaser has no difficulty in figuring out how to assemble the unit and can fasten the parts together easily by simply clinching over the projecting portions of the lugs.

(2) The provision of projecting lugs on the vertical edges of the side wall pieces that fit between lugs provided on abutting edges of the end walls so that stout corners can be formed readily by merely bending the projecting portions of the lugs at right angles.

(3) The provision of flanged top and bottom pieces into which the body of the unit fits snugly when assembled so that the structure is quite rigid despite the method of quick assembly employed.

(4) The provision in the body of the unit of an inclined feeding trough with an upturned flange of a predetermined height on the front to provide exactly the rise designed to discourage feeding of other farm animals and help keep the bait dry, the unit having in combination with this trough piece a hopper front piece disposed a predetermined distance back from the flange at the front of the trough and in a predetermined upwardly spaced relation to the bottom of the trough and also spaced relative to the adjacent side wall of the body forming the back of the hopper to enable dry storage of a good supply of bait while providing gravity feeding thereof to the trough as the bait is consumed and at the same time enabling easy refilling of the hopper through the top of the unit when the lid is removed.

(5) The provision in the body of the unit of a runway in front of the trough with aligned openings in the opposite ends so that rats can see through the unit from end to end and are therefore not afraid to enter, the openings being at the same time spaced sufficiently from the bottom of the unit and from the front of the trough so that the bait is protected from the weather and will remain dry, and (6) The provision for easy removability of the bottom piece to enable easy cleaning out of the unit from time to time, the bottom piece being separate from the trough so that removal of the bottom piece for cleaning does not necessitate disturbing anything else and there is no needless wasting of bait.

The invention is illustrated in the accompanying drawing in which—

Figure 1 is a perspective view of a baiting station made in accordance with my invention, showing the lid in elevated relationship to the top of the body to enable better illustration, and Fig. 2 is an end view of a baiting station similar to Fig. 1 but without the feeding trough and related hopper built in, this unit having smaller feeding and watering troughs mounted therein.

Referring to Fig. 1, the reference number 1 designates the body of the baiting station generally which is entirely of sheet metal construction and made up of rectangular side pieces 2 and 3 and rectangular end pieces 4 and 5, the four pieces being secured together at the four corners of the body by the interfitting of spaced rectangular lugs 6—8 on the ends of the side pieces with spaced rectangular lugs 9—10 on the ends of the end pieces and the bending of these lugs at right angles so that the lugs 6—8 have abutment with the outer face of the end pieces 4—5 while lugs 9—10 have abutment with the outer face of the side pieces 2—3. The sheet metal employed is preferably about 28 gauge for economy and also to enable bending of the lugs easily by hand or with a hammer. A top cover piece 11 and a bottom piece 12 are both rectangular and of identical dimensions and hence are interchangeable, thereby avoiding confusion for the purchaser when assembling the unit. When the body 1 is set down in the bottom piece 12 the upwardly projecting flanges 13 on the opposite ends and the upwardly projecting flanges 14 on the opposite sides of the bottom piece serve to make the body 1 quite rigid despite the method of assembling, and, of course, when the top 11 is applied, the corresponding flanges 13' and 14' abutting the ends and sides of the upper portion of the body make it all the more rigid. The upwardly projecting flanges 13 and 14 on the bottom piece exclude surface water and the downwardly projecting flanges 13' and 14' on the top piece give good protection from the weather so that the bait will remain dry and is not apt to get moldy.

At 15 is indicated a feeding trough of one-piece sheet metal construction, comprising a rectangular inclined bottom 16 with an upwardly projecting flange 17 on the front edge of a predetermined height and an upwardly projecting flange 18 on the rear edge of less height arranged to engage the inner side of the adjacent side wall 2, the trough 15 being assembled in the lower portion of the body 1 on one side of the middle of the bottom 12, the other side 19 of the middle serving as a runway lengthwise of the body to which access may be had from either end through circular entrance and exit holes 20 and 21 provided in the end pieces 4 and 5, respectively. These holes are of a predetermined size (approximately 2" diameter) and with their centers at a predetermined height from the bottom piece 12 (approximately 2") which experience has shown is adequate for entrance of rats and mice but does not encourage other farm animals to enter. In special cases, where the average size of the rats is larger, as in river areas and on ships, and around dumps and docks, the diameter of the holes will be increased to suit the needs of the situation. The size and elevation of these holes as well as the spacing of these holes laterally with respect to the front wall 17 of the trough is also important from the standpoint of protection of the bait from the weather. The size of the holes in relation to the length of the unit is also such that the runway 19 provides the kind of hidden place in which rats are accustomed to eating, and experience has shown that rats, mice, and the like will enter traps and feeding units of the present type so long as they can see all the way through the unit from end to end and hence are not afraid to enter, and, of course, the holes 20 and 21 at opposite ends of the runway serve that purpose. Proper disposition and inclination of the trough 15 is assured, and also its easy assembly in the body, by providing an inclined lower slot 22 in each of the end pieces 4—5 through which lugs 23 on opposite ends of the trough may be entered, the projecting end portions of these lugs being bent at right angles to clinch the connections.

A hopper 24 for storage of a good supply of bait is defined above the trough 15 when an inclined front piece 25 for the hopper is assembled in the body with its top edge in the plane of the top of the body 1 and its bottom edge elevated to a predetermined extent with respect to the bottom 16 of the trough. Exact placement of the front piece 25 and correct inclination thereof also is assured when lugs 26 provided on opposite ends of the piece 25 are entered in slots 27 provided therefor in the end pieces 4 and 5, the projecting end portions of the lugs being bent at right angles similarly as lugs 23 to clinch the connections. The slots 27 in one end wall are in aligned relationship with the corresponding slots 27 in the other end wall, some of the slots in each end wall being in aligned relation to one another and located in vertically spaced relation to the lower slot 22.

In operation, all of the sheet metal pieces of which the baiting station is built are flat when they reach the purchaser with the exception of the top and bottom pieces 11 and 12 and the trough 15, and consequently, a fairly compact package may be made of the unit in its knockdown form for shipment. The purchaser, upon receipt of the package, will have no difficulty in assembling the unit because the end pieces 4 and 5 are interchangeable, and the purchaser need only be careful to have the holes 20 and 21 arranged in line with one another. There is only one way in which the trough 15 can be installed because the lugs 23 are not at the middle of the bottom 16 and they can be entered in slots 22 only when the trough is set as shown. The front piece 25 for the hopper 24 can be installed with either end abutting either end piece. Very simple instructions sent with the unit in shipment are therefore sufficient to enable anyone to assemble it. The six features outlined above are all believed to be clear from the foregoing description. The baiting station when ready for use and filled with a suitable poisonous food, such as warfarin mixed bait, is portable and can be placed wherever it is apt to be entered most frequently by the rats, mice, or other pests to be disposed of. Being portable, the station can be moved from place to place until the best location is found and the best results are obtained.

Referring to Fig. 2, 1' designates the body or housing of another baiting station which is of the same construction as that of Fig. 1 only so far as the housing is concerned, the same having rectangular side pieces 2 and 3 and rectangular end pieces 4 and 5, these four pieces being secured together at the four corners of the body by interfitting lugs similarly as in Fig. 1, and the housing having a top cover piece 11 and a bottom piece 12 which together serve to make the body 1' quite rigid, despite the method of assembly. In this unit I provide instead of the built-in trough 15 and hopper 24 a separate smaller feeding trough F having only a fraction of the capacity of the trough 15 and hopper 24, whereby to economize on the amount of bait used. In order to hold the trough F in place on one side of the runway 19 between the holes 20 and 21 provided in opposite ends of the body 1' I provide one or more lugs 28 on the upper back portion of the trough F which hook over the top edge of the side wall 2 under the cover 11. In a similar way a watering trough W may be provided in the unit alongside the feeding trough F and hooked onto the side wall 2 by one or more lugs 28, the trough W containing the same poison, warfarin, in solution that is contained in the bait in trough F. The plan is that in some cases both troughs F and W will be provided and in other cases only the feeding trough F or only the watering trough W, depending on circumstances, each of the troughs being of a small size, having a fraction of the capacity of trough 15 and hopper 24.

It is believed the foregoing description conveys a good understanding of the objects and advantages of my invention. The appended claims have been drawn to cover all legitimate modifications and adaptations.

I claim:

1. A baiting station comprising a body structure of knockdown construction having parallel end walls and parallel side walls at right angles to said end walls, said end walls each having a hole provided therein which are adapted to serve as aligned entrance and exit holes, each of said end walls also having slots provided therein in aligned relationship with slots provided in the other end wall, some of said slots in each wall being in aligned relation to one another and located in vertically spaced relation to a lower slot that is inclined relative to the horizontal, an elongated feed trough plate of the same length as said side walls extending between the lower portion of said end walls on one side of said entrance and exit holes, said plate having an upwardly bent flange on one of its longitudinal edges and having lugs projecting from its opposite ends and being disposed at an inclination determined by the inclination of the lower ones of the slots in said end walls in which said lugs are entered, an elongated hopper plate of the same length as said trough plate extending between the upper portion of said end walls having lugs projecting from its opposite ends entered in the other slots in said end walls and being thereby located and supported at a predetermined elevation relative to said trough plate and in a predetermined spaced relation to the adjacent side wall with which it defines a hopper, means securing the end walls and side walls together, and top and bottom closures detachably mounted on the top and bottom of said body structure, the removable bottom closure defining the bottom of a runway between the entrance and exit holes.

2. A baiting station according to claim 1, wherein the means securing the end and side walls together comprises lugs on the ends of the end walls and the adjoining ends of the side walls having close interfitting engagement, the lugs on the end walls being bent onto the outer side of the adjacent side walls, and the lugs on the side walls being bent onto the outer side of the adjacent end walls.

3. A baiting station according to claim 1, wherein the closures have marginal flanges and the body structure fits closely inside the flanges and is thereby held in shape.

4. A baiting station according to claim 1, wherein the means securing the end and side walls together comprises lugs on the ends of the end walls and the adjoining ends of the side walls, having close interfitting engagement, the lugs on the end walls being bent onto the outer side of the adjacent side walls, and the lugs on the side walls being bent onto the outer side of the adjacent end walls, the closures having marginal flanges, the body structure fitting closely inside said flanges and being thereby held in shape.

References Cited in the file of this patent

UNITED STATES PATENTS

| | | |
|---|---|---|
| 500,848 | Breul | July 4, 1893 |
| 1,189,204 | Kuentzel | June 27, 1916 |
| 1,321,360 | Bright | Nov. 11, 1919 |
| 1,561,644 | Hanson | Nov. 17, 1925 |
| 2,265,618 | Adams | Dec. 9, 1941 |
| 2,683,326 | Gardner et al. | July 13, 1954 |
| 2,714,780 | Glover | Aug. 9, 1955 |
| 2,724,071 | Larson | Nov. 15, 1955 |

FOREIGN PATENTS

| | | |
|---|---|---|
| 754,978 | France | 1933 |